United States Patent [19]

Love et al.

[11] Patent Number: 5,011,320
[45] Date of Patent: Apr. 30, 1991

[54] BEARING FOR A BALL AND SOCKET JOINT

[75] Inventors: Mickey L. Love; Douglas V. Massey, both of Oklahoma City, Okla.

[73] Assignee: Dana Corporation, Toledo, Ohio

[21] Appl. No.: 453,601

[22] Filed: Dec. 20, 1989

[51] Int. Cl.$^5$ .............................................. F16C 11/06
[52] U.S. Cl. .................................... 403/132; 403/133; 403/140
[58] Field of Search .................... 403/39, 38, 133, 132, 403/135, 140

[56] References Cited

U.S. PATENT DOCUMENTS

| | | |
|---|---|---|
| 2,527,787 | 10/1950 | Berger . |
| 3,063,744 | 11/1962 | Flumerfelt . |
| 3,411,815 | 11/1968 | Sullivan, Jr. . |
| 3,530,495 | 9/1970 | Kindel . |
| 3,560,035 | 2/1971 | Kindel . |
| 3,647,249 | 3/1972 | Baba et al. . |
| 3,677,587 | 7/1972 | Schmidt et al. . |
| 3,787,127 | 1/1974 | Cutler ................................... 403/133 |
| 3,969,030 | 7/1976 | Sullivan .............................. 403/132 |
| 3,999,870 | 12/1976 | Clark et al. ..................... 403/132 X |
| 4,003,667 | 1/1977 | Gaines et al. ................... 403/132 X |
| 4,430,016 | 2/1984 | Matsuoka et al. . |
| 4,577,989 | 3/1986 | Ito ..................................... 403/39 X |
| 4,790,682 | 12/1988 | Henkel ............................... 403/140 |

Primary Examiner—Peter M. Cuomo
Attorney, Agent, or Firm—MacMillan, Sobanski & Todd

[57] ABSTRACT

An improved bearing for use in a ball and socket joint is disclosed. The bearing is generally cylindrical in shape, having a recess formed in one end thereof. The recess defines a semi-spherical bearing surface adapted to engage and support a head portion of a ball member of the joint. A plurality of lubricant passageways are formed through the bearing. Each of the passageways extends axially from the semi-spherical bearing surface to an annular channel formed in the opposite end of the bearing. A plurality of grooves are also formed in the opposite end of the bearing. The grooves extend radially inwardly from the channel to a central recess formed in the opposite end of the bearing. The channel functions as a reservoir for lubricant, thereby permitting the joint to be used without frequently re-injecting lubricant therein. An annular bead is formed about the circumference of the channel to provide a seal which prevents lubricant from escaping from the joint.

17 Claims, 1 Drawing Sheet

BEARING FOR A BALL AND SOCKET JOINT

BACKGROUND OF THE INVENTION

This invention relates in general to ball and socket joints and in particular to an improved bearing for use in such a joint.

Ball and socket joints are well known mechanical devices which are frequently used in vehicle suspension and steering systems. Such a joint typically includes a hollow cylindrical socket member having an opened end and a closed end. The closed end of the socket member has an aperture formed therethrough. A ball member of the joint is provided with a rounded head portion and a shaft portion extending therefrom. The joint is assembled by inserting the shaft portion of the ball member within the socket member and through the aperture formed in the closed end thereof. The head portion is retained within the socket member by a closure plate attached to the socket member to close the opened end. Frequently, one or more bearings are provided within the socket member to engage and support the head portion of the ball member. These bearings reduce the amount of friction between the two members. Also, the bearings frequently accommodate for looseness between the ball and socket members resulting from wear.

To further reduce the effects of friction and to prevent dirt and other contaminants from entering, the joint is usually provided with some means for injecting lubricant therein and for distributing such lubricant throughout the mating surfaces of the bearings and the head portion of the ball member. Many bearing structures have been developed with grooves formed in these mating surfaces for distributing the lubricant over the bearings and the head portion. Unfortunately, such grooves can become clogged or wear thin so as to prevent the passage of lubricant therethrough. Consequently, the service life of the joint may be greatly reduced. Furthermore, the presence of such grooves reduces the effective area of the mating surfaces of the bearings and the head portion. This reduced area lessens the load carrying capability of the joint and may shorten the service life of the joint. Lastly, because only a relatively small volume of lubricant can be injected into such grooves, frequent re-injection of lubricant is necessary to properly maintain the joint.

SUMMARY OF THE INVENTION

This invention relates an improved bearing for use in a ball and socket joint. The bearing is generally cylindrical in shape, having a recess formed in one end thereof. The recess defines a semi-spherical bearing surface adapted to engage and support a head portion of a ball member of the joint. A plurality of lubricant passageways are formed through the bearing. Each of the passageways extends axially from the semi-spherical bearing surface to an annular channel formed in the opposite end of the bearing. A plurality of grooves are also formed in the opposite end of the bearing. The grooves extend radially inwardly from the channel to a central recess formed in the opposite end of the bearing. The channel functions as a reservoir for lubricant, thereby permitting the joint to be used without frequently re-injecting lubricant therein. An annular bead is formed about the circumference of the channel to provide a seal which prevents lubricant from escaping from the joint.

It is an object of this invention to provide an improved bearing for use in a ball and socket type joint.

It is another object of this invention to provide such a bearing having no grooves formed on the bearing surface thereof, yet which still provides sufficient lubricant throughout such bearing surface.

It is a further object of this invention to provide such a bearing with a reservoir for retaining lubricant therein for use over an extended period of time.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figures 1, 2:
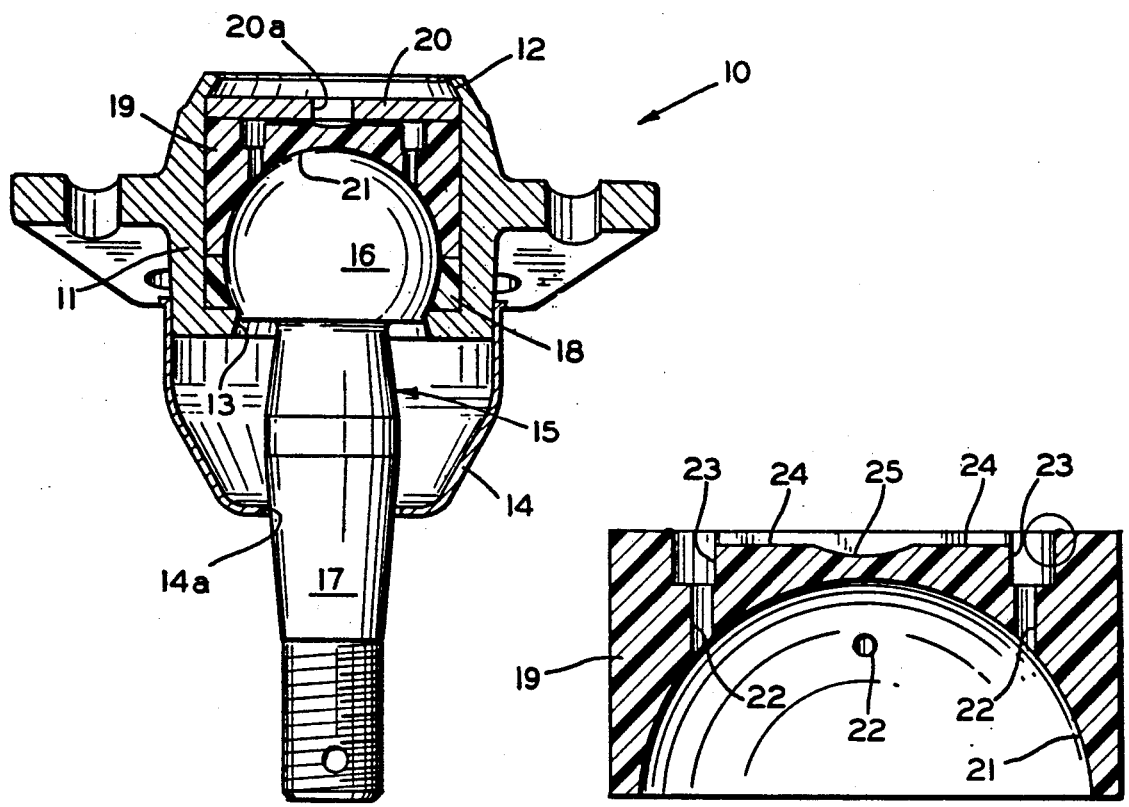
FIG. 1 is a sectional elevational view of a ball and socket joint including an improved bearing in accordance with this invention.
FIG. 2 is an enlarged sectional elevational view of the bearing illustrated in FIG. 1.

Referring now to the drawings, there is illustrated in FIG. 1 a ball and socket joint, indicated generally at 10, in accordance with this invention. The joint 10 includes a socket member 11 formed generally in the shape of a hollow cylinder. The upper end of the socket member 11 is opened, having a flange portion 12 formed thereabout. The flange 12 is curled or angled radially inwardly when the joint 10 is assembled, as will be explained in detail below. The lower end of the socket member 11 is closed. However, an aperture 13 is formed through the closed end of the socket member 11. A flexible boot 14 is connected about the lower end of the socket member 11. The lower end of the flexible boot 14 is closed, except for a central aperture 14a formed therethrough which is aligned with the aperture 13 and the longitudinal axis of the socket member 11.

A ball member, indicated generally at 15, cooperates with the socket member 11 to form the joint 10. The ball member 15 includes a head portion 16 having an elongated shaft portion 17 extending therefrom. The head portion 16 is formed having a generally spherical outer bearing surface and is disposed within the socket member 11. The shaft portion 17 extends through the aperture 13 formed through the lower end of the socket member 11 and through the aperture 14a formed through the flexible boot 14.

To engage and support the head portion 16 of the ball member 15 within the socket member 11, a lower annular bearing ring 18 is provided. The bearing ring 18 is positioned between the lower side of the head portion 16 and the lower inner circumferential surface of the socket member 11, adjacent to the closed end thereof. The bearing ring 18 has a generally semi-spherical bearing surface formed therein which engages and supports the lower side of the head portion 16.

An upper bearing 19 is also disposed within the socket member 11 to engage and support the head portion 16. The bearing ring 18 and the upper bearing 19 are preferably formed from a cross linkable polyethylene material. The bearing 19 is positioned between the upper side of the head portion 16 and the upper inner circumferential surface of the socket member 11, adjacent to the opened end thereof. The structure of the bearing 19 is described in detail below. A circular closure plate 20 is retained between the curled or angled flange 12 and the upper end of the bearing 19. The closure plate 20 has an aperture 20 formed therethrough, for a purpose which will be described below.

Initially, the flange portion 12 of the socket member 11 is formed to extend straight axially upwardly from the socket member 11. To assemble the joint 10, the bearing ring 18 is first disposed within the socket member 11. Then, the shaft portion 17 of the ball member 15 is inserted downwardly through the opened upper end of the socket member 11. As a result, the shaft portion 17 is moved through the bearing ring 18 and the aperture 13 until the lower side of the head portion 16 abuts the bearing ring 18. The bearing 19 is next disposed within the socket member 11 so as to rest upon the upper side of the head portion 16. Lastly, the closure plate 20 is disposed adjacent to the upper end of the bearing 19, and the flange portion 12 of the socket member 11 is curled or angled radially inwardly to the position illustrated in FIG. 1. The flange portion 12 urges the closure plate 20 against the bearing 19 such that the head portion 16 of the ball member 15 is firmly supported without looseness within the socket member 11. Following the assembly of the joint 10 in this manner, the boot 14 may be secured to the lower end of the socket member 11 such that the shaft portion 17 extends through the central aperture 14a.

Figures 3, 4:
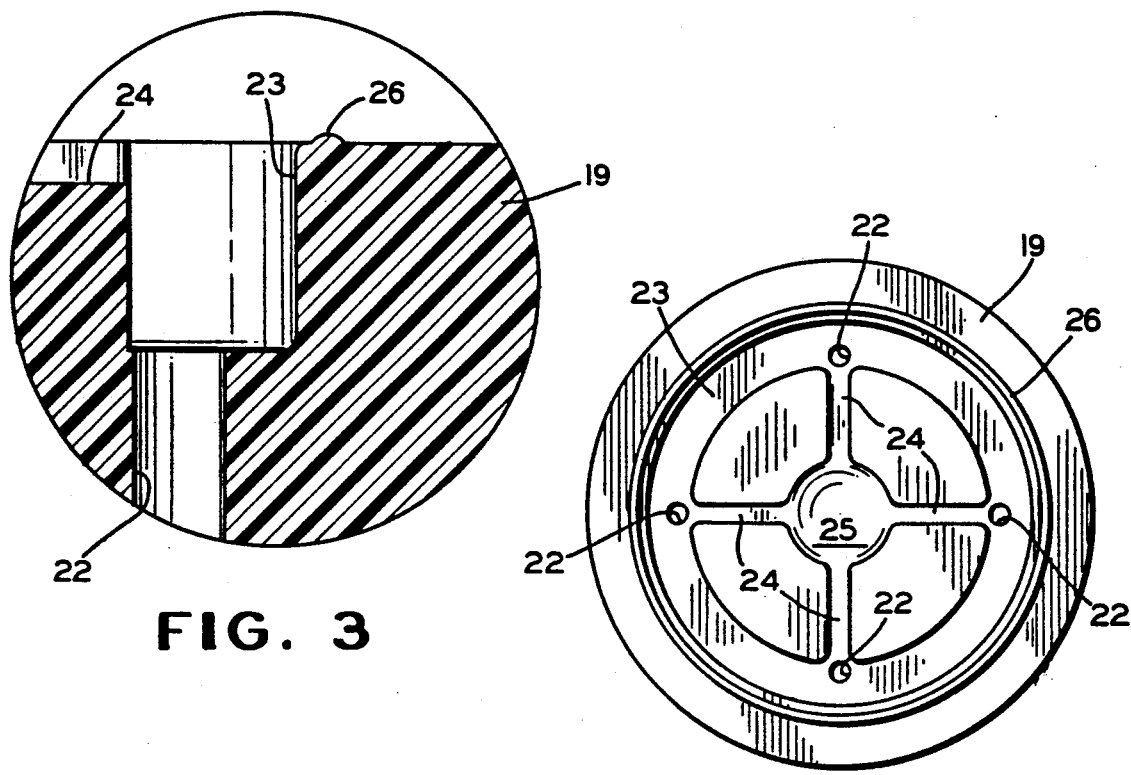
FIG. 3 is an enlarged view of the circled portion of the bearing illustrated in FIG. 2.
FIG. 4 is a top plan view of the upper end of the bearing illustrated in FIG. 2.

Referring now to FIGS. 2, 3, and 4, the structure of the bearing 19 is illustrated in detail. As shown therein, the bearing 19 is generally cylindrical in shape, having a relatively large semi-spherical recess formed in the lower end thereof. This recess defines a semi-spherical bearing surface 21 which engages the corresponding semi-spherical bearing surface formed on the upper side of the head portion 16, as described above. A plurality of lubricant passageways 22 are formed through the bearing 19. Each of the passageways 22 extends axially upwardly from the semi-spherical bearing surface 21 to an annular channel 23 formed in the surface of the upper end of the bearing 19. A plurality of grooves 24 are also formed in the surface of the upper end of the bearing 19. The grooves 24 extend radially inwardly from the channel 23 to a central recess 25. In the illustrated embodiment, four passageways 21 and four grooves 24 are formed symmetrically in the upper end of the bearing 19.

An annular bead 26 is formed on the upper end of the bearing 19, as best shown in FIGS. 3 and 4. The bead 26 extends about the circumference of the channel 23. When the joint 10 is assembled in the manner described above, the bead 26 is engaged and compressed by the closure plate 20. Consequently, a fluid tight seal is formed between the upper end of the bearing 19 and the closure plate 20.

As mentioned above, the closure plate 20 has a central aperture 20a formed therethrough. This aperture 20a is provided to receive a conventional lubricant fitting (not shown). The lubricant fitting is typically a check valve which permits the injection of lubricant downwardly therethrough into the area defined between the lower surface of the closure plate 20 and the upper end of the bearing 19. As lubricant is injected through the fitting, it passes into the central recess 25, through the radial grooves 24, and into the annular channel 23. The sealing bead 26 prevents the injected lubricant from escaping from the channel 23 over the upper end of the bearing 19. The fitting prevents the lubricant from passing upwardly therethrough out of the joint 10.

The annular channel 23 functions as a reservoir for storing a relatively large volume of lubricant therein. The lubricant which is stored in the channel 23 is then metered downwardly through the axial passageways 22 onto the semi-spherical surface of the head portion 16 of the ball member 15 and the bearing surface 21 of the bearing 19. As the joint 10 is used, the ball member 15 is moved relative to the socket member 11 in both oscillating and rotating fashion. Such movements cause the lubricant to be sufficiently distributed over the mating bearing surfaces of the head portion 16 and the bearing 19, without the presence of additional grooves formed in the semi-spherical bearing surface 21. This makes the bearing 19 much easier to fabricate than known bearings.

Furthermore, the absence of such distribution grooves in the semi-spherical bearing surface 21 permits virtually the entire area of such surface 21 to engage and support the head portion 16. In the illustrated embodiment, approximately 98% of the semi-spherical bearing surface 21 engages the head portion 16 (the remaining 2% constituting the openings in such surface 21 for the axial passageways 22). Thus, the bearing 19 can support larger loads imposed thereon than a comparable bearing having distribution grooves formed therein.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A ball and socket joint comprising:
    a generally hollow socket member;
    a ball member disposed within said socket member; and
    a bearing disposed within said socket member including a body portion having a first and second ends, a bearing surface formed in said first end engaging and supporting said ball member, reservoir means formed in a surface of said second end including a central recess and a groove extending outwardly from said central recess along said surface of said second end, said reservoir means adapted to store a quantity of lubricant therein, and a passageway extending through said body portion from said bearing surface to said reservoir means groove, whereby lubricant is permitted to pass from said reservoir means to said bearing surface and said ball member.

2. The invention defined in claim 1 further including a closure plate for retaining said bearing means within said socket member.

3. The invention defined in claim 1 wherein said body portion is generally cylindrical in shape and said first and second ends are opposite ends of said body portion.

4. The invention defined in claim 1 wherein said reservoir means further includes an annular channel formed in said second end, said groove extending from said central recess to said annular channel.

5. The invention defined in claim 1 wherein said reservoir means includes a plurality of grooves extending outwardly from said central recess along said second end.

6. The invention defined in claim 5 wherein a passageway is formed through said body portion from said bearing surface to each of said reservoir means grooves.

7. The invention defined in claim 5 wherein said reservoir means further includes an annular channel formed in said second end, each of said plurality of grooves extending from said central recess to said annular channel.

8. The invention defined in claim 1 further including seal means formed on said second end about said reservoir means.

9. The invention defined in claim 8 wherein said seal means includes an annular rib formed about said reservoir means.

10. A bearing adapted to be disposed within a socket member for engaging and supporting a ball member therein to form a ball and socket joint comprising:
a body portion having a first and second ends;
a bearing surface formed in said first end adapted to engage and support the ball member;
reservoir means formed in a surface of said second end including a central recess and a groove extending outwardly from said central recess along said surface of said second end, said reservoir means adapted to store a quantity of lubricant therein; and
a passageway extending through said body portion from said bearing surface to said reservoir means groove, whereby lubricant is permitted to pass from said reservoir means to said bearing surface.

11. The invention defined in claim 10 wherein said body portion is generally cylindrical in shape and said first and second ends are opposite ends of said body portion.

12. The invention defined in claim 10 wherein said reservoir means further includes an annular channel formed in said second end, said groove extending from said central recess to said annular channel.

13. The invention defined in claim 10 wherein said reservoir means includes a plurality of grooves extending outwardly from said central recess along said second end.

14. The invention defined in claim 13 wherein a passageway is formed through said body portion from said bearing surface to each of said reservoir means grooves.

15. The invention defined in claim 13 wherein said reservoir means further includes an annular channel formed in said second end, each of said plurality of grooves extending from said central recess to said annular channel.

16. The invention defined in claim 10 further including seal means formed on said second end about said reservoir means.

17. The invention defined in claim 16 wherein said seal means includes an annular rib formed about said reservoir means.

* * * * *